US009802335B2

(12) United States Patent
Lee et al.

(10) Patent No.: US 9,802,335 B2
(45) Date of Patent: *Oct. 31, 2017

(54) METHODS AND SYSTEMS FOR THE FORMATION AND USE OF REDUCED WEIGHT BUILDING BLOCKS FORMS

(71) Applicant: Bautex Systems, LLC, San Marcos, TX (US)

(72) Inventors: Oliver Tsung Wen Lee, San Antonio, TX (US); Paul Scott Kolliker Brown, Dripping Springs, TX (US); Christopher James Leonard, New Braunfels, TX (US)

(73) Assignee: Bautex Systems, LLC, San Marcos, TX (US)

( * ) Notice: Subject to any disclaimer, the term of this patent is extended or adjusted under 35 U.S.C. 154(b) by 192 days.

This patent is subject to a terminal disclaimer.

(21) Appl. No.: 14/683,817

(22) Filed: Apr. 10, 2015

(65) Prior Publication Data

US 2015/0315089 A1 Nov. 5, 2015

Related U.S. Application Data

(63) Continuation of application No. 14/561,956, filed on Dec. 5, 2014.

(Continued)

(51) Int. Cl.
*B28B 1/08* (2006.01)
*B28B 1/087* (2006.01)
(Continued)

(52) U.S. Cl.
CPC .............. *B28B 1/087* (2013.01); *B28B 1/008* (2013.01); *B28B 1/08* (2013.01); *B28B 1/084* (2013.01);
(Continued)

(58) Field of Classification Search
CPC B28B 1/087; B28B 1/08; B28B 1/008; B28B 1/084; B28B 3/022; B28B 7/0422; C04B 40/0067; C04B 2111/40
See application file for complete search history.

(56) References Cited

U.S. PATENT DOCUMENTS 3,021,291 A 2/1962 Thiessen
3,214,393 A 10/1965 Sefton et al.
(Continued)

OTHER PUBLICATIONS

Non-Final Office Action for U.S. Appl. No. 14/561,956 dated Nov. 14, 2016.
(Continued)

*Primary Examiner* — Kara Boyle
(74) *Attorney, Agent, or Firm* — Meyertons, Hood, Kivlin, Kowert & Goetzel, P.C.

(57) ABSTRACT

In some embodiments, a method may include preparing building forms including at least some cementitious materials. The method for preparing forms may include mixing substantially dry cementitious material particles with closed cell foam particles to form a substantially dry composition. In some embodiment, at least some of the cementitious material particles may adhere to at least some surface deformations on the surface of the closed cell foam particles. In some embodiments, the method may include mixing a second portion of water with the substantially dry composition for a second period of time to form a partially wet composition. In some embodiments, a method may include forming a building form including at least some cementitious materials from the partially wet composition. In some embodiments, the closed cell foam particles may include expanded polystyrene. In some embodiments, a ratio of the water to cementitious material particles may range from 0.20 to 0.40.

14 Claims, 5 Drawing Sheets

Related U.S. Application Data

(60) Provisional application No. 61/986,829, filed on Apr. 30, 2014.

(51) Int. Cl.

| | | |
|---|---|---|
| *C04B 26/04* | (2006.01) | |
| *B28B 1/00* | (2006.01) | |
| *B28B 1/14* | (2006.01) | |
| *C04B 40/00* | (2006.01) | |
| *C04B 38/10* | (2006.01) | |
| *B28B 1/093* | (2006.01) | |
| *B28C 7/04* | (2006.01) | |
| *B28B 3/02* | (2006.01) | |
| *B28B 23/00* | (2006.01) | |
| *C04B 28/02* | (2006.01) | |
| *C04B 40/02* | (2006.01) | |
| *C04B 111/40* | (2006.01) | |

(52) U.S. Cl.
CPC ............... *B28B 1/093* (2013.01); *B28B 1/14* (2013.01); *B28B 3/022* (2013.01); *B28B 23/0087* (2013.01); *B28C 7/0422* (2013.01); *C04B 26/04* (2013.01); *C04B 28/02* (2013.01); *C04B 38/106* (2013.01); *C04B 40/0039* (2013.01); *C04B 40/0067* (2013.01); *C04B 40/02* (2013.01); *C04B 2111/40* (2013.01); *Y02W 30/92* (2015.05)

(56) References Cited

U.S. PATENT DOCUMENTS

| | | |
|---|---|---|
| 3,257,338 A | 6/1966 | Sefton |
| 3,272,765 A | 9/1966 | Sefton |
| 3,775,240 A | 11/1973 | Harvey |
| 3,789,101 A | 1/1974 | Wright et al. |
| 3,817,013 A | 6/1974 | Selby |
| 3,869,295 A | 3/1975 | Bowles et al. |
| 3,883,359 A | 5/1975 | Harvey |
| 3,885,363 A | 5/1975 | Whitley |
| 3,933,570 A | 1/1976 | Wright et al. |
| 3,982,369 A | 9/1976 | Keleske |
| 4,011,355 A | 3/1977 | Mandish et al. |
| 4,027,445 A | 6/1977 | Nickerson |
| 4,038,798 A | 8/1977 | Sachs |
| 4,040,855 A | 8/1977 | Rady-Pentek et al. |
| 4,207,718 A | 6/1980 | Schaaf et al. |
| 4,211,738 A | 7/1980 | Genis |
| 4,238,242 A | 12/1980 | Park |
| 4,330,632 A | 5/1982 | Haynes et al. |
| 4,398,958 A | 8/1983 | Hodson et al. |
| 4,482,384 A | 11/1984 | Miller |
| 4,584,043 A | 4/1986 | Riefler |
| 4,590,729 A | 5/1986 | Hegazi |
| 4,625,484 A | 12/1986 | Oboler |
| 4,711,058 A | 12/1987 | Patton |
| 4,815,244 A | 3/1989 | Harrington |
| 4,905,439 A * | 3/1990 | Filteau .................... E04C 1/41 106/672 |
| 4,986,049 A | 1/1991 | Kennedy et al. |
| 5,000,891 A | 3/1991 | Green |
| 5,007,218 A | 4/1991 | Bengtson et al. |
| 5,112,405 A | 5/1992 | Sanchez |
| 5,138,808 A | 8/1992 | Bengtson et al. |
| 5,186,883 A | 2/1993 | Beall, III |
| 5,234,754 A * | 8/1993 | Bache ................. B28B 23/0081 106/725 |
| 5,256,222 A | 10/1993 | Shepherd et al. |
| 5,308,396 A | 5/1994 | Kovacs |
| 5,387,050 A | 2/1995 | Hovis et al. |
| 5,472,498 A | 12/1995 | Stephenson et al. |
| 5,488,806 A | 2/1996 | Melnick et al. |
| 5,564,823 A | 10/1996 | Holik |
| 5,575,600 A | 11/1996 | Giannuzzi et al. |
| 5,580,378 A | 12/1996 | Shulman |
| 5,608,999 A | 3/1997 | McNamara |
| 5,697,196 A | 12/1997 | Salahuddin |
| 5,728,209 A | 3/1998 | Bury et al. |
| 5,737,896 A | 4/1998 | Rodgers |
| 5,803,669 A | 9/1998 | Bullard |
| 5,845,445 A | 12/1998 | Blackbeard |
| 5,881,511 A | 3/1999 | Keller, Jr. |
| 5,913,791 A | 6/1999 | Baldwin |
| 5,974,762 A | 11/1999 | Rodgers |
| 6,016,633 A | 1/2000 | Elwart |
| 6,085,480 A | 7/2000 | Baldwin |
| 6,170,220 B1 | 1/2001 | Moore, Jr. |
| 6,176,920 B1 | 1/2001 | Murphy et al. |
| 6,205,726 B1 | 3/2001 | Hoadley |
| 6,218,002 B1 | 4/2001 | Wehtje |
| 6,263,638 B1 | 7/2001 | Long, Sr. |
| 6,279,285 B1 | 8/2001 | Kubica |
| 6,314,694 B1 | 11/2001 | Cooper et al. |
| 6,321,497 B1 | 11/2001 | Cormier |
| 6,363,683 B1 | 4/2002 | Moore, Jr. |
| 6,382,892 B1 | 5/2002 | Hempfling |
| 6,397,549 B1 | 6/2002 | Baldwin |
| 6,438,917 B2 | 8/2002 | Kubica |
| 6,513,293 B2 | 2/2003 | Miller |
| 6,530,185 B1 | 3/2003 | Scott et al. |
| 6,557,818 B2 | 5/2003 | Manthci |
| 6,746,532 B2 | 6/2004 | Boronkay |
| 6,827,570 B2 | 12/2004 | Sumrall et al. |
| 6,851,235 B2 | 2/2005 | Baldwin |
| D509,597 S | 9/2005 | Yanagisawa |
| 6,974,317 B2 | 12/2005 | Sumrall |
| 7,032,357 B2 | 4/2006 | Cooper et al. |
| 7,037,047 B1 | 5/2006 | Tufts et al. |
| 7,114,296 B2 | 10/2006 | Klassen et al. |
| 7,284,351 B2 | 10/2007 | Cooper et al. |
| 7,300,610 B2 | 11/2007 | Loeffler-Lenz |
| 7,326,478 B2 | 2/2008 | Bouscal et al. |
| 7,409,800 B2 | 8/2008 | Budge |
| 7,415,805 B2 | 8/2008 | Nickerson |
| 7,644,548 B2 | 1/2010 | Guevara et al. |
| 7,654,052 B2 | 2/2010 | Cooper et al. |
| 7,765,759 B2 | 8/2010 | Au et al. |
| 7,805,906 B2 | 10/2010 | Garrett |
| RE41,994 E | 12/2010 | Mensen |
| 8,029,617 B2 | 10/2011 | Guevara et al. |
| 2002/0017741 A1 | 2/2002 | Sumrall et al. |
| 2002/0112427 A1 | 8/2002 | Baldwin |
| 2003/0029106 A1 | 2/2003 | Cooper et al. |
| 2003/0079420 A1 | 5/2003 | Klassen et al. |
| 2003/0141615 A1 | 7/2003 | Sumrall |
| 2005/0072112 A1 | 4/2005 | Sumrall et al. |
| 2005/0257457 A1 | 11/2005 | Sumrall |
| 2005/0257458 A1 | 11/2005 | Sumrall |
| 2005/0260296 A1 | 11/2005 | Sumrall |
| 2005/0262793 A1 | 12/2005 | Sumrall |
| 2005/0284098 A1 | 12/2005 | Sumrall |
| 2006/0000172 A1 | 1/2006 | Sumrall |
| 2007/0107364 A1 | 5/2007 | Estes et al. |
| 2008/0016810 A1 | 1/2008 | Cooper et al. |
| 2008/0156963 A1 | 7/2008 | Davies et al. |
| 2008/0157430 A1 | 7/2008 | Davies et al. |
| 2008/0160126 A1 | 7/2008 | Davies et al. |
| 2008/0314295 A1 | 12/2008 | Guevara et al. |
| 2015/0314473 A1 | 11/2015 | Lee et al. |
| 2015/0314474 A1 | 11/2015 | Lee et al. |
| 2015/0314476 A1 | 11/2015 | Lee et al. |
| 2015/0314477 A1 | 11/2015 | Lee et al. |
| 2015/0314478 A1 | 11/2015 | Lee et al. |
| 2015/0315077 A1 | 11/2015 | Lee et al. |
| 2015/0315089 A1 | 11/2015 | Lee et al. |

OTHER PUBLICATIONS

Non-Final Office Action for U.S. Appl. No. 14/683,764 dated Dec. 28, 2016.

(56) References Cited

OTHER PUBLICATIONS

Non-Final Office Action for U.S. Appl. No. 14/683,773 dated Dec. 22, 2016.
Non-Final Office Action for U.S. Appl. No. 14/683,817 dated Jan. 18, 2017.
Non-Final Office Action for U.S. Appl. No. 14/683,827 dated Dec. 21, 2016.
Non-Final Office Action for U.S. Appl. No. 14/683,834 dated Jan. 19, 2017.
Non-Final Office Action for U.S. Appl. No. 14/683,845 dated Dec. 29, 2016.

* cited by examiner

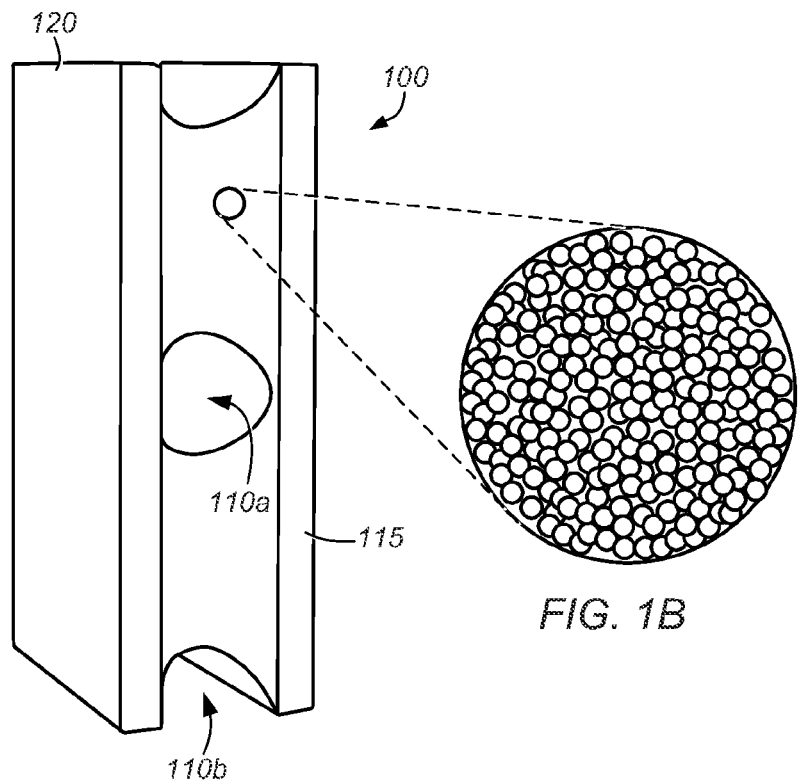
FIG. 1A
FIG. 1B
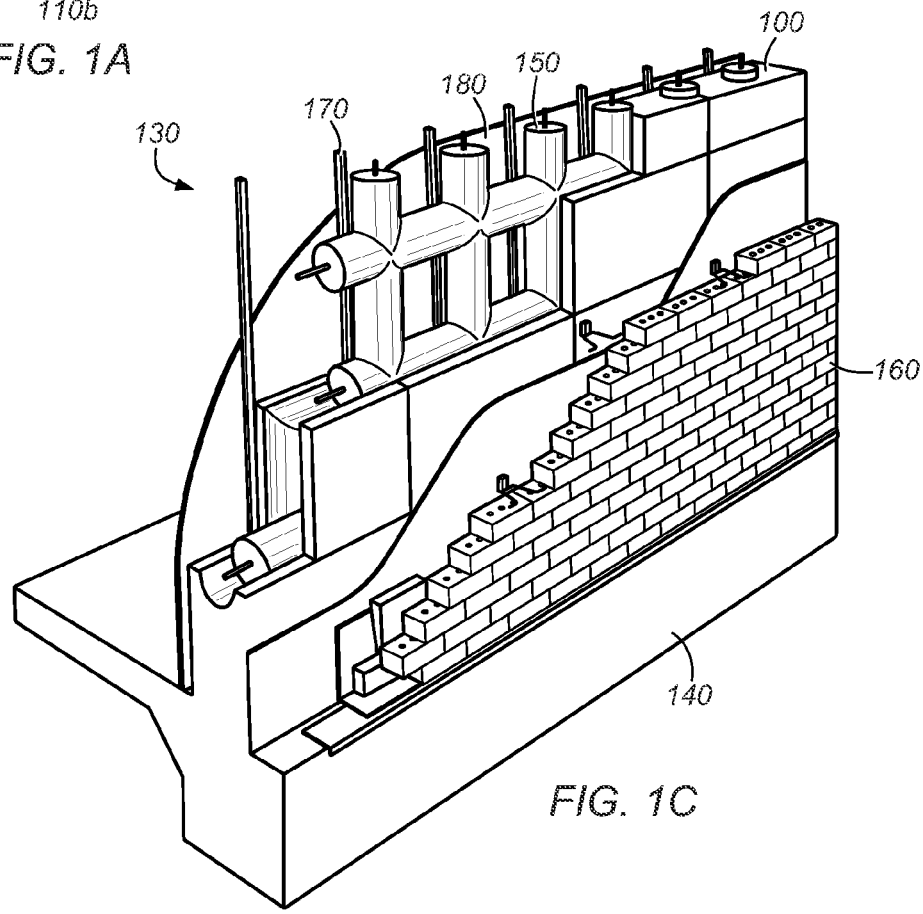
FIG. 1C

TABLE 4a: Upper Bound

| Frequency | Log-Amplitude [mm/s] |
|---|---|
| 0 | 200 |
| 20 | 200 |
| 30 | 200 |
| 150 | 25 |
| 350 | 2.0 |
| 600 | 1.0 |

FIG. 4A

TABLE 4b: Lower Bound

| Frequency | Log-Amplitude [mm/s] |
|---|---|
| 0 | 0.1 |
| 20 | 0.1 |
| 50 | 5.0 |
| 150 | 0.5 |
| 400 | 0.1 |
| 600 | 0.1 |

FIG. 4B

METHODS AND SYSTEMS FOR THE FORMATION AND USE OF REDUCED WEIGHT BUILDING BLOCKS FORMS

CLAIM OF PRIORITY

This application is a continuation of U.S. patent application Ser. No. 14/561,956 entitled "METHODS AND SYSTEMS FOR THE FORMATION AND USE OF REDUCED WEIGHT BUILDING BLOCKS FORMS" filed on Dec. 5, 2014, which claims benefit of priority of U.S. Provisional Application Ser. No. 61/986,829 entitled "METHODS AND SYSTEMS FOR THE FORMATION AND USE OF REDUCED WEIGHT BUILDING BLOCKS FORMS" filed Apr. 30, 2014, the contents of all of which are incorporated by reference herein in their entirety and for all purposes.

BACKGROUND OF THE INVENTION

1. Field of the Invention

The present disclosure generally relates to building forms. More particularly, the disclosure generally relates to a method and system for making building forms including systems and methods for manufacturing building forms including at least some cementitious materials.

2. Description of the Relevant Art

Recent innovations in cement-based construction materials have led to improved durability, and overall quality. Building blocks and panels made of a mixture of polystyrene foam, cement, and other admixtures have come into use. These composite building blocks can be stacked or otherwise arranged during construction in the same general manner as ordinary cement blocks to form walls and other construction elements. Composite building blocks and panels can be shaped.

Because these composite building blocks and panels contain a significant proportion of polystyrene foam, they are lighter and easier to handle during construction than pure concrete blocks of similar size. Because of their composition, such blocks and panels are easy to shape for installation of, for example, electrical wiring or plumbing. Such composite blocks and panels have the additional advantage of providing a greater insulating value when compared with traditional building materials. The R-value of such blocks and panels is typically higher than exhibited by buildings constructed of traditional building materials. In addition to R-value, the wall system provides thermal mass. The combination of continuous insulation, high R-value, and thermal mass give the energy efficiency performance of the wall system. Such composite blocks and panels are highly fire and pest resistant, dramatically reducing the risk of fire or pest damage to structures made with them.

In a typical process for manufacturing such blocks and panels, varying amounts of polystyrene foam and cement are mixed with chemical admixtures to hold the foam granules together in a lightweight composite mixture. The lightweight composite mixture is poured into a mold and cured in the mold until it has hardened enough to be handled by people or machinery.

SUMMARY

In some embodiments, a method may include preparing building forms including at least some cementitious materials. The method for preparing forms may include mixing substantially dry cementitious material particles with closed cell foam particles to form a substantially dry composition. At least some of the cementitious material particles may adhere to at least some surface deformations on the surface of the closed cell foam particles. In some embodiments, the method may include mixing a second portion of water with the substantially dry composition for a second period of time to form a partially wet composition. In some embodiments, a method may include forming a building form including at least some cementitious materials from the partially wet composition. In some embodiments, the closed cell foam particles may include expanded polystyrene. In some embodiments, the water to cementitious material by weight may range from 0.20 to 0.33 or from 0.20 to 0.40 by weight. The resulting building form may include a reduced weight composite building form.

In some embodiments, the cementitious materials may include cement and fly ash.

In some embodiments, the closed cell foam particles may include polystyrene. The closed cell foam particles may include expanded polystyrene.

In some embodiments, a method may include containing the partially wet composition in a dispenser. The dispenser may form at least a portion of a substantially automated building form production system. The method may further include mechanically transferring a first portion of the partially wet composition from the dispenser to a mold coupled to the dispenser to form the first portion into a desired shape. The method may include mechanically releasing the first portion of the partially wet composition from the mold. The method may include mechanically transferring a second portion of the partially wet composition from the dispenser to the mold to form the second portion into the desired shape. The method may include mechanically releasing the second portion of the partially wet composition from the mold. The method may further include curing the first portion and the second portion of the partially wet composition to form a building form including at least some cementitious materials.

In some embodiments, the method may include mechanically transferring the first portion of the partially wet composition from the dispenser to a conveyance container (e.g., a fill cart). The method may include mechanically transferring the first portion of the partially wet composition from the conveyance container to the mold.

In some embodiments, the method may include vibrating the conveyance container while transferring the first portion (e.g., at between about 35 Hz to 42 Hz or 35 Hz to 60 Hz (e.g., using machine settings)). The conveyance container may be moved back and forth above the mold while transferring the first portion. The method may include screeding at least some excess first portion above an upper level of the open mold using the conveyance container.

In some embodiments, the method may include compressing the first portion of the partially wet composition in the mold (e.g., to about 60-90% of the first portions initial volume). The first portion of the partially wet composition may be compressed in the mold using a tamper and/or a vibrator (e.g., between about 50 to 60 Hz (e.g., using machine settings)). The first portion of the partially wet composition may be compressed for a period of time including, for example, between 1 to 20 seconds, between 3 to 8 seconds, or between 4 to 6 seconds.

In some embodiments, mechanically releasing the first portion of the partially wet composition from the mold comprises releasing the first portion from the mold in less than 2 minutes, less than 1 minute, less than 30 seconds, or less than 10 seconds.

In some embodiments, vibration, within certain parameters during one or more steps of the manufacturing process, of the mold, the partially wet composition, or both may be essential to automatically manufacturing building forms in an efficient manner. In some embodiments, making the building form may include vibration with a log-amplitude between a first boundary and a second boundary. In some embodiments, the first and the second boundaries may be described as piecewise linear functions connecting the points. In some embodiments, the first boundary may include a log-amplitude of about 200 mm/s at 0 Hz frequency, about 200 mm/s at 20 Hz frequency, about 200 mm/s at 30 Hz frequency, about 25 mm/s at 150 Hz frequency, about 2.0 mm/s at 350 Hz frequency, and about 1.0 mm/s at 600 Hz frequency. The second boundary may include a log-amplitude of about 0.1 mm/s at 0 Hz frequency, about 0.1 mm/s at 20 Hz frequency, about 5.0 mm/s at 50 Hz frequency, about 0.5 mm/s at 150 Hz frequency, about 0.1 mm/s at 400 Hz frequency, and about 0.1 mm/s at 600 Hz frequency (e.g., as described in methods).

BRIEF DESCRIPTION OF THE DRAWINGS

Advantages of the present invention may become apparent to those skilled in the art with the benefit of the following detailed description of the preferred embodiments and upon reference to the accompanying drawings.

FIG. 1A depicts a diagram of a perspective view of an embodiment of a building form.

FIG. 1B depicts a diagram of an embodiment of a close-up detailed view of an outer surface of the building form depicted in FIG. 1A. This is merely one embodiment, in other embodiments closed cell foam particles may be more compacted together or more densely than depicted.

FIG. 1C depicts a diagram of a perspective view of an embodiment of building forms used to construct a portion of a wall of a building.

FIGS. 4A-B depict two tables (i.e., TABLE 4a and TABLE 4b) showing points along the upper and lower vibration boundaries for systems and/or methods of preparing building forms.

Figure 2:
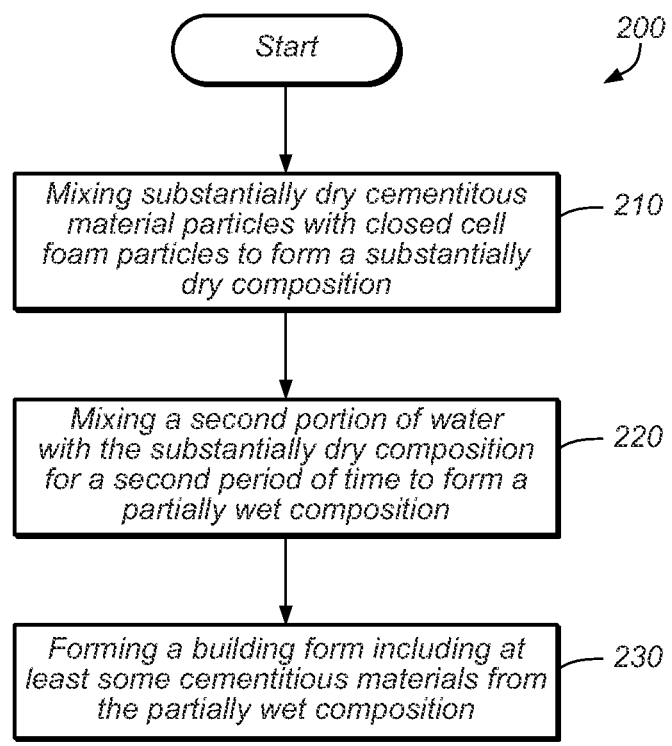
FIG. 2 depicts a flow chart of a method for preparing building forms including at least some cementitious materials.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112 paragraph (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a form" includes one or more forms.

DETAILED DESCRIPTION

Definitions

Unless defined otherwise, all technical and scientific terms used herein have the same meaning as commonly understood by one of ordinary skill in the art.

The term "cementitious materials" as used herein generally refers to any of various building materials which may be mixed with a liquid, such as water, to form a cement base substance, and to which an aggregate may be added; includes cements, limes, and pozzolans.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

The term "piecewise linear function" as used herein generally refers to a function composed of straight-line sections.

In some embodiments, a system and/or a method may include preparing building forms including at least some cementitious materials. FIGS. 1A-B depict a diagram of a perspective view of an embodiment of a building form 100. In some embodiments, a building form may include a lightweight material (for example lightweight relative to concrete building blocks (e.g., concrete masonry units (CMU)). In some embodiments, the building form may be formed from materials which are fire resistant, pest (e.g., termite, rodent, etc.) resistant, sound dampening, durable, provide increased safety from storm/wind damage, and/or provide a greater relative insulation value (e.g., relative to other common building materials). In some embodiments, building forms may be formed from at least partially recycled materials. Building forms may not be substantially structurally supportive (e.g., as regards the building itself).

In some embodiments, building forms 100 may include a plurality of channels 110 formed within and/or along one or more edges 115 of the building form. Channels or openings 110a may extend through the body 120 of the building form. Channels 110b may extend along an edge of the building form. Channels 110b may have a shape equivalent to half of an opening 110a cut along a longitudinal axis. When building forms 100 are stacked on top of one another and/or adjacent to one another along their edges two channels 110b positioned adjacent one another form an opening (e.g., similar to channels 110b, although they do not have to have the same cross section). Channels 110 may include any number of shape cross sections. Circular openings may include advantages such as inhibiting formation of air bubbles when the openings are filled with, for example, concrete or grout. In some embodiments, channels 110 may be approximately 6" in diameter. In some embodiments, channels 110 may be arranged in a grid approximately 16 inches on center. In some embodiments, the building form may be about 10 inches wide by about 16 inches high by about 32 inches long.

FIG. 1C depicts a diagram of a perspective view of an embodiment of building forms 100 used to construct a portion of a wall 130 of a building. As depicted in FIG. 1C building forms 100 may be stacked atop one another such that channels 110a from adjacent forms are aligned forming a channel which runs vertically (or alternatively horizontally) through the wall. Channels 110b along edges 115 may form openings 110b when building forms are positioned adjacent to one another. Once positioned the channels in the building form may form an interconnecting network. Building forms may be positioned upon a suitably stable building platform 140 (e.g., poured concrete slab foundation). Structurally supportive building materials 150 may be positioned in channels 110 after the building forms are all positioned for a section of wall and/or as the building forms are positioned. Structural materials may include, for example, metal columns or beams or rods (e.g., rebar) and/or concrete. Rebar may be positioned in one or more of the channels followed by concrete. The rebar/concrete may provide the structural stability for the walls and building once positioned and cured. Typically, the structural materials are rebar and concrete. In some cases, the concrete may be replaced with a structural or non-structural grout. In some embodiments, the structural components may be supplemented with a wide flange steel beam or column or with a steel pipe column. In such embodiments, the portions of the wall that are concrete/rebar may be structurally tied to the areas of the walls that are supplemented with steel columns or beams. Any number of types of facing may be applied to the exterior side (e.g., brick 160, stucco, siding, membranes, etc.) or interior side (e.g., wood or metal studs 170, sheetrock 180, plaster, etc.) of the wall as required.

FIG. 2 depicts a flow chart of a method 200 for preparing building forms including at least some cementitious materials. The method for preparing forms may include mixing substantially dry cementitious material particles with closed cell foam particles to form a substantially dry composition (210). At least some of the cementitious material particles may adhere to at least some surface deformations on the surface of the closed cell foam particles.

In some embodiments, mixing substantially dry cementitious material particles with closed cell foam particles to form a substantially dry composition may include combining the closed cell foam particles with a first portion of substantially dry cementitious material particles to form a dry composition. In some embodiment, the first portion of the substantially dry cementitious material particles may include about 40 to 60% of the substantially dry cementitious material particles of the total amount of particles to be added. The first portion may include about 50% or more of the total amount of particles to be added. Once combined the dry composition may be mixed or agitated in some way for a first period of time. The first period of time may include about 10 to 60 seconds, about 20 to 40 seconds or about 25 to 35 seconds. At least some of the cementitious material particles may adhere to at least some surface deformations on the surface of the closed cell foam particles. Typically polystyrene is mixed with a wet cement mixture (wherein water and cement have been mixed previously) or water, polystyrene, and cement are mixed together all at once. Mixing or agitating a portion of the dry cementitious material particles with the closed cell foam particles prior to adding water may allow the dry cementitious material particles to adhere to the surface of the closed cell foam particles (for example to surface deformations on the closed cell foam particles). This may promote better adhesion of the wet cementitious material upon mixing water with the dry cementitious material particles and the closed cell foam particles mixture relative to current methods. Premixing a portion of the dry cementitious material particles and the closed cell foam particles may break up any clumps of the dry cementitious material particles before the water is added such that the amount of required cementitious material is reduced.

In some embodiments, the method may further include combining a first portion of water with the dry composition to form the substantially dry composition. In some embodiments, the first portion of water may include about 10 to 30% of the total amount of water to be added to make the substantially dry composition. The method may include combining the substantially dry composition with a second portion of substantially dry cementitious material particles.

In some embodiments, the method may include mixing a second portion of water with the substantially dry composition (220) for a second period of time to form a partially wet composition. The second period of time may include about 50 to 100 or about 50 to 120 seconds, about 60 to 90 seconds or about 70 to 80 seconds. In some embodiments, a ratio of the total water to the total cementitious material particles ranges from 0.20 to 0.40, 0.20 to 0.33, 0.23 to 0.28, or 0.24 to 0.26 by weight. In some embodiments, a ratio of the total water to the total cementitious material particles may range from 0.20 to 0.40 by weight. Typically if the ratio is less than 0.23 or greater than 0.28, then a manufactured building form may not be structurally sound (e.g., the building form once removed from the mold may collapse before curing). For example, too little water and the partially wet composition will not stick together to make a building form when removed from a mold while substantially uncured in an automated process. If too much water then the partially wet composition will collapse and not hold its shape when removed from a mold while substantially uncured in an automated process. In some embodiments, a method may include forming a building form including at least some cementitious materials from the partially wet composition (230).

In some embodiments, mixing the second portion of water with the substantially dry composition further comprises mixing at least one additive with the second portion of water and the substantially dry composition. At least one of the additives may include plasticizers, super plasticizers, air entrainers, or viscosity modifiers. In some embodiments, additives may form less than 5% by weight. In some embodiments, using more additives is possible and should not affect the end product significantly; however, more additives may not be used due to the associated costs.

Solid foams form a class of lightweight cellular engineering materials. Solid foams are classified into two types based on their pore structure: open cell foam structures and closed cell foam structures. Open cell foam structures contain pores that are connected to each other and form an interconnected network that is relatively soft. Open cell foam structures will fill with whatever they are exposed to, which may affect the properties of the foam. Closed cell foam structures do not have interconnected pores. The closed cell foam structures normally have higher compressive strength due to their structures. However, closed-cell foams are in general denser, require more material, and as a consequence are more expensive to produce. The closed cells may be filled with a specialized gas to provide improved insulation. The closed-cell structure foams have higher dimensional stability, low moisture absorption coefficients, and higher strength compared to open cell foam structures.

In some embodiments, the closed cell foam particles may be formed at least in part from homopolymers, copolymers, polyolefins, polycarbonates, polyesters, polyamides, natural rubbers, and synthetic rubbers. In some embodiments, the closed cell foam particles may be formed at least in part from polystyrene. In some embodiments, the closed cell foam particles may include hexabromocyclododecane or other brominated compounds to, for example, provide additional fire resistance.

In some embodiments, closed cell foam particles may be formed from new or unrecycled polystyrene. In some embodiments, closed cell foam particles may be formed at least partially from recycled polystyrene, which has been melted down and reformed into expanded polystyrene beads. Shredded polystyrene as is currently used in industry may cause problems as opposed to "newly" expanded beads. Shredded polystyrene may produce an inconsistent mix for the building form. One of the main issues with shredded polystyrene is the inconsistency of the raw material which makes it more difficult to manufacture the composite building form and also results in very inconsistent product dimensions, density and overall performance of the product. Newly expanded beads may be expanded to a desired size and/or desired shape in a uniform and consistent manner.

In some embodiments, the closed cell foam particles may be formed at least in part from expanded polystyrene. Polystyrene is extracted from oil. Expanded polystyrene starts as small cylindrical or spherical beads with a typical diameter of 0.5-1.5 mm. They may contain an expanding agent. In some embodiments, the expanded polystyrene beads may be formed from unexpanded beads with a mean unexpanded bead size of 0.50 mm to 1.40 mm, 0.70 mm to 1.10 mm, or 0.80 mm to 0.90 mm. In some embodiments, the expanded polystyrene beads may be formed from unexpanded beads with a mean unexpanded bead size of 0.85 mm. Expanded polystyrene beads may include a 1 mm to a 7 mm average diameter. Expanded polystyrene beads may include a 3.5 mm average diameter. Expanded polystyrene beads may include a 0.005 g/cc to 0.025 g/cc bulk density (0.31 to 1.56 pcf). Expanded polystyrene beads may include a 0.008 g/cc to 0.016 g/cc bulk density (0.5 to 1.0 pcf). Unexpanded beads may be pushed during expansion resulting in particles with a lower density but with a broken surface which is not smooth as standard beads are. Pushed beads may have surface imperfections that may include wrinkles, dimples, and cracks. Pushed beads may be exposed to more steam and/or higher temperatures and/or to longer dwell times during expansion which expands the bead beyond its engineered specifications, thereby creating surface imperfections that may include wrinkles, dimples, and/or cracks.

Typically expanded polystyrene beads have a generally smooth texture. However, during the expansion process the beads may be over expanded ("pushed") such that the surface of the bead wrinkles forming surface deformations including wrinkles, dimples, and cracks. In some embodiments, when dry particles are mixed with the over expanded polystyrene beads the particles adhere to the surface deformations of the "wrinkled" particles.

Cementitious materials generally refers to any of various building materials which may be mixed with a liquid, such as water, to form a cement based substance, and to which an aggregate may be added; includes cements, limes, and pozzolans. In some embodiments, the cementitious materials may include cement and fly ash. Fly ash (i.e., flue ash) generally refers to one of the residues generated in combustion. Fly ash may include the fine particles that rise with flue gases. Ash which does not rise is generally referred to as bottom ash. In an industrial context, fly ash usually refers to ash produced during combustion of coal. Fly ash is generally captured by electrostatic precipitators or other particle filtration equipment before the flue gases reach the chimneys of coal-fired power plants. Fly ash when combined with bottom ash removed from the bottom of the furnace is known as coal ash. Depending upon the source and makeup of the coal being burned, the components of fly ash vary considerably, but typically fly ash includes silicon dioxide ($SiO_2$) (both amorphous and crystalline) and calcium oxide (CaO), both being endemic ingredients in many coal-bearing rock strata. In some embodiments, cementitious materials may include Portland cement, pozzolanic cements, gypsum cements, or silica cements. In some embodiments, cementitious materials may include Portland cement or pozzolanic cements.

In some embodiments, the building form includes a reduced weight composite building form.

Figure 3:
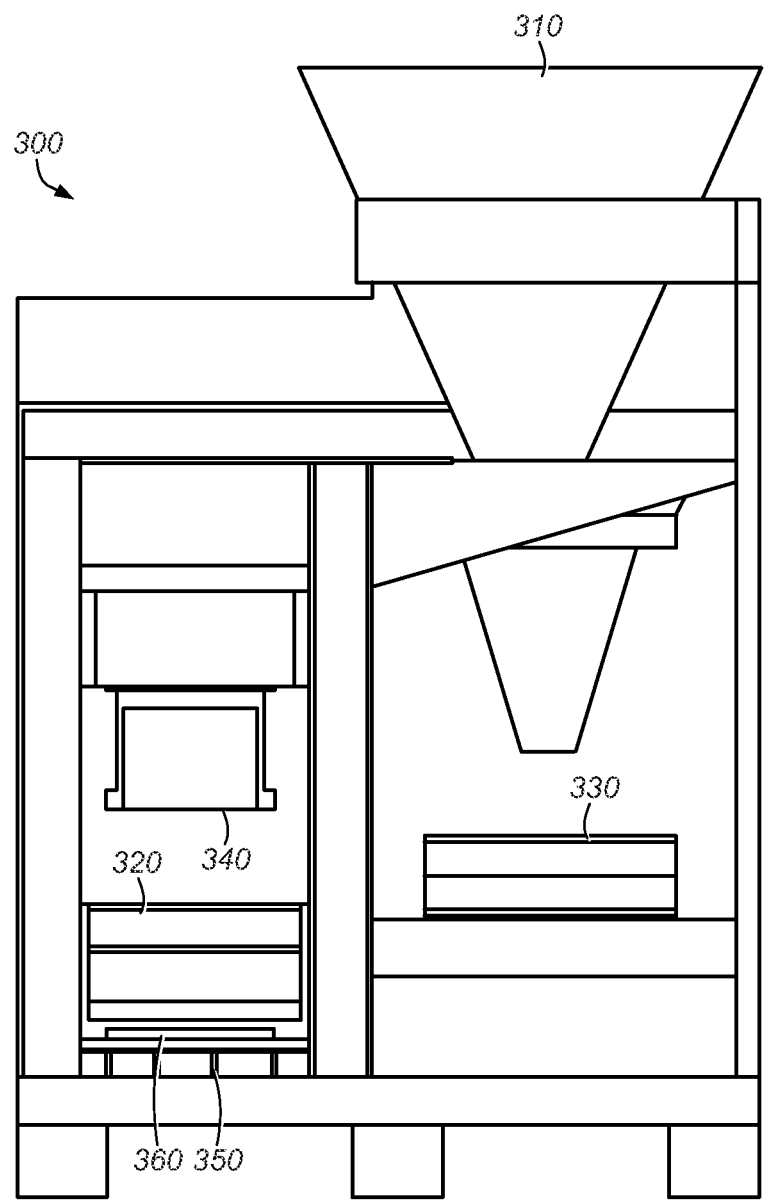
FIG. 3 depicts a diagram of a perspective view of an embodiment of a system for preparing building forms.

In some embodiments, a system may produce a composite building form. The system may function to manufacture composite building forms in a substantially automatic or substantially "autonomous" fashion such that once the system is started up very little human interaction (except, for example, through software based adjustments) is required during the manufacturing process. An automated mechanical process may significantly reduce the financial costs associated with manufacturing the building forms. FIG. 3 depicts a diagram of a perspective view of an embodiment of a system 300 used for preparing building forms 100. In some embodiments, the system or method may include combining substantially dry cementitious material particles with closed cell foam particles to form a substantially dry composition. The system may mix the substantially dry composition such that at least some of the cementitious material particles adhere to at least some surface deformations on the surface of the closed cell foam particles. The system may mix water with the substantially dry composition to form a partially wet composition. In some embodiments, a mixer (not pictured) may be used to combine and mix the components together. A mixer may use any number of different agitation methods to mix the components together.

In some embodiments, closed cell foam particles may be measured by weight (e.g., pounds) into a weigh dispenser using calibrated load scales. Cement may be measured by weight (e.g., pounds) into a weigh dispenser using calibrated load scales. Fly ash may be measured by weight (e.g., pounds) into a weigh dispenser using calibrated load scales. Cement and fly ash may form at least a portion of a cementitious material. The same weigh dispenser may be used for the cement and the fly ash; however, the fly ash and cement may be measured individually and then summed. Water may be measured volumetrically or by weight. Additives, if employed, may be measured volumetrically. The additives may be pneumatically pumped into a measuring vessel.

In some embodiments, all of the weighed closed cell foam particles may be dispensed into the mixer. A first portion (e.g., 50%) of the weighed dry cementitious material particles may be dispensed into the mixer. The first portion and the closed cell foam particles may be mixed together for period of time (e.g., 30 seconds). A first portion of the water (e.g., 25%) may be added to cementitious material particles and the closed cell foam particles mixture. Remaining (e.g., 50%) weighed dry cementitious material particles may be dispensed into the mixer. The remaining water (e.g., 75%) of the water and any additives are introduced to the mixer. The resulting mixture is then mixed for a period of time (e.g., 75 seconds). The resulting partially wet cementitious material may be transferred to a dispenser 310. In some embodiments, a conveyor may automatically transfer the partially wet cementitious material from the mixer to the dispenser 310. In some embodiments, the mixer may release the partially wet cementitious material through a discharge door automatically to the dispenser 310 (e.g., dispenser 310 may be disposed below the mixer). The partially wet cementitious material may include 10 to 20% by volume cementitious material. The partially wet cementitious material may include 10 to 50% by volume cementitious material. The partially wet cementitious material may include 60 to 90% by volume closed cell foam particles. The partially wet cementitious material may include 50 to 90% by volume closed cell foam particles.

In some embodiments, the system or method may include mechanically transferring a first portion of the partially wet composition from the dispenser 310 to a mold 320 coupled to the dispenser to form the first portion into a desired shape. In some embodiments, mechanically transferring the first portion of the partially wet composition from the dispenser to the mold may include mechanically transferring the first portion of the partially wet composition from the dispenser 310 to a conveyance container 330. The first portion may be transferred from the dispenser 310 to a conveyance container 330 using gravitation and/or vibration. The first portion of the partially wet composition may be mechanically transferred from the conveyance container 330 to the mold 320. The conveyance container may be used to automatically move portions of the composition from the dispenser to the mold along tracks, etc.

In some embodiments, mechanically transferring the first portion of the partially wet composition from the conveyance container to the mold may include moving the conveyance container back and forth above the mold while transferring the first portion. In some embodiments, mechanically transferring the first portion of the partially wet composition from the conveyance container to the mold may include screeding at least some excess first portion above an upper level of the open mold using the conveyance container. In some embodiments, mechanically transferring the first portion of the partially wet composition from the conveyance container to the mold may include vibrating the conveyance container while transferring the first portion. In some embodiments, a vibration table sits below the mold. The mold may be clamped down on top of a carrier (e.g., a production pallet) positioned on the vibration table during the fill and/or compression stage. In some embodiments, the vibration may be directed to the mold but transfers to the conveyance container since they are in direct contact with each other. The conveyance container (and in some embodiments the mold) may be vibrated at between about 35 Hz to 42 Hz or about 35 Hz to 60 Hz (e.g., 38 Hz running at 50% power (11 kW, approximately 15 HP) (e.g., using machine settings)) while transferring the first portion. In some embodiments, the conveyance container (and in some embodiments the mold) may be vibrated at 38 Hz running at 50% power (11 kW, approximately 15 HP (e.g., using machine settings)), based upon machine specifications/settings actual readings may vary. In some embodiments, the first portion may be transferred by moving the conveyance container back and forth while vibrating the conveyance container. The mold may be filled for about 2 to 20 seconds, about 4 to 15 seconds, or about 7 to 9 seconds (e.g., 8 seconds).

When transferring a partially wet composition with more than 50% closed cell foam particles to a mold the composition tends to just form a mound in the mold and not fill the mold spaces and as such vibration of the mold assists in spreading out the composition evenly in the mold. Similar systems may have been used to produce pavers; however pavers are formed from a far denser material such as concrete which may have a higher water content such that gravity works well enough to fill a mold evenly and vibration is not needed.

In some embodiments, the first portion of the partially wet composition may be compressed in the mold. The first portion of the partially wet composition may be compressed in the mold to about 60-90% or about 80-90% (e.g., 87%) of the first portions initial volume. In some embodiments, one or more tampers 340 may be used to compress the first portion of the partially wet composition in the mold. In some embodiments, one or more vibrators 350 (e.g., vibration table) may be used to consolidate the first portion of the partially wet composition in the mold. The mold itself may be vibrated. The first portion may be compressed/consolidated in the mold for a period of time (e.g., about 1 to 20 seconds, about 1 to 10 seconds, 3 to 8 seconds, or 4 to 6 seconds). The mold may be vibrated during compression at about 50 to 60 Hz (e.g., 55 Hz at 60% power (13.2 kW, approximately 18 HP) (e.g., using machine settings)). In some embodiments, the mold may be vibrated during compression at 55 Hz at 60% power (13.2 kW, approximately 18 HP (e.g., using machine settings)), based upon machine specifications/settings, actual readings may vary. The first portion may be compressed/consolidated in the mold using tampers 340 and vibrators 350 simultaneously. In some embodiments, frequency and/or acceleration ranges may be essential for producing a building form including closed cell foam particles. In some embodiments, a system may include a core puller 360.

In some embodiments, the first portion of the partially wet composition may be mechanically released from the mold. Releasing the first portion may include turning all vibrators off. In some embodiments, a mold may be formed from at least three portions. The mold may include a body, a core plate, and one or more tamper heads. The mold body may form the four sides of the building form and the central full core of the building form. The core plate may form a bottom shoulder and bottom half channels or half cores. The tamper head may form a top shoulder and top half channels or half cores. The mold may be mechanically lifted a portion of a height of the first portion (e.g., <10 mm, <5 mm, or about 1 mm). A core plate may be pulled away from the first portion. In some embodiments, the mold may be quickly (e.g., instantaneously) lifted away from the molded first portion. The tampers may remain in position (i.e., adjacent an upper surface of the molded first portion) while the mold is lifted away. After removing the mold the tampers may be removed from contacting the upper surface of the molded first portion. In some embodiments, mechanically releasing the first portion of the partially wet composition from the mold comprises releasing the first portion from the mold in less than 2 minutes, less than 1 minute, less than 30 seconds, or less than 10 seconds. As mentioned the building form must be properly formed in the mold, including, but not limited to being properly compressed and consolidated as well as have a proper consistency (as based as least in part upon the ratio of water to cementitious material to closed cell foam particles) such that the building form may be released from the mold quickly and in an uncured state. Being able to remove the uncured building form from the mold quickly is a major contributing factor for allowing a system to be substantially automated vastly improving the efficiency of the manufacturing process of building forms over current methods.

FIGS. 4A-B depicts two tables (i.e., TABLE 4a and TABLE 4b) showing points along the upper and lower vibration boundaries for systems and/or methods of preparing building forms.

Figure 5:
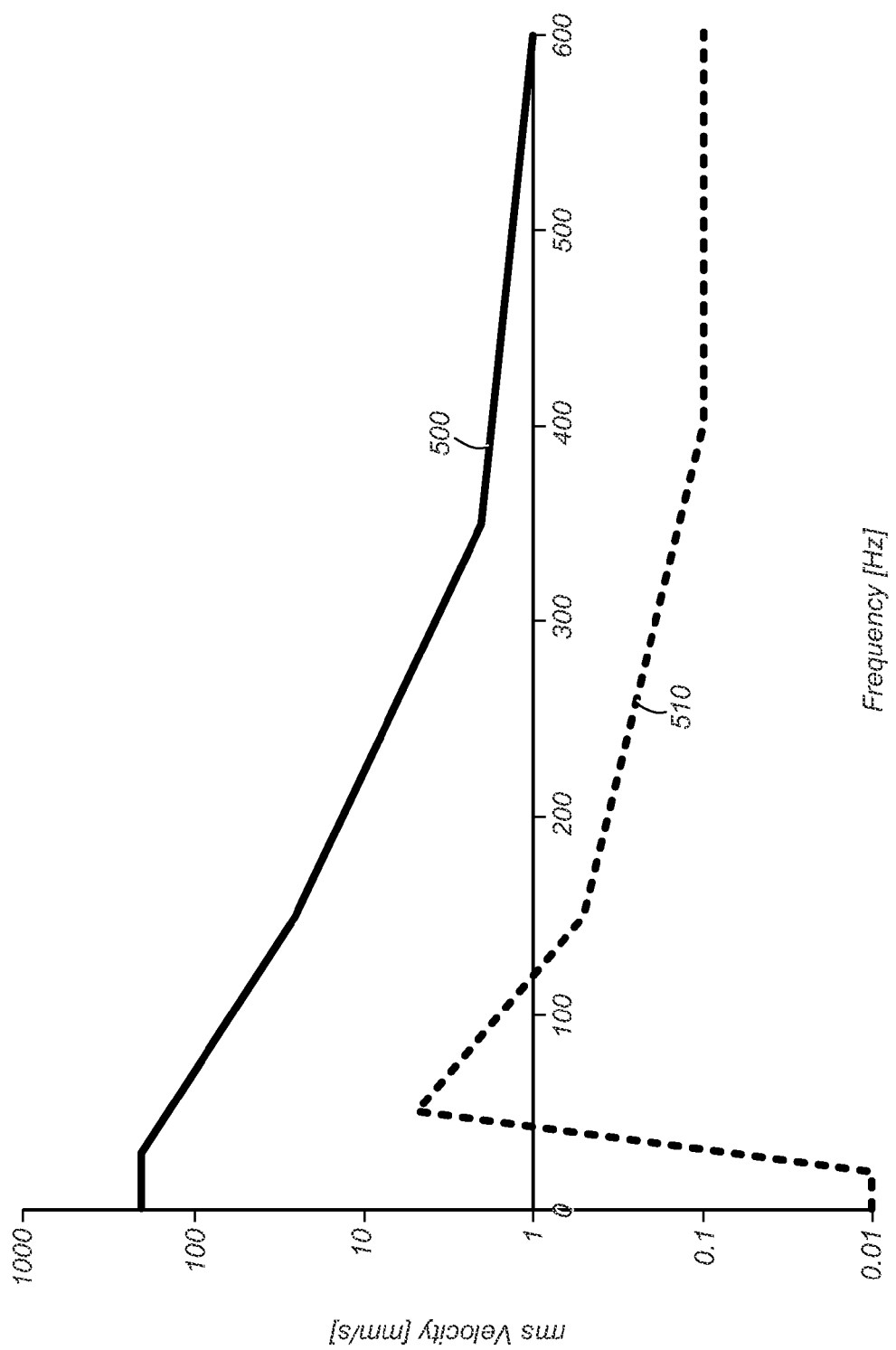
FIG. 5 depicts a graphical representation of the operational vibration boundaries for systems and/or methods of preparing building forms.

FIG. 5 depicts a graphical representation of the operational boundaries of vibration for systems and/or methods of preparing building forms expressed as log-amplitude (root-mean-square (rms) velocity in mm/s) verses frequency (Hz). The upper boundary as depicted in FIG. 5 by line 500 is a piecewise linear function connecting the points in Table 4a of FIG. 4A. The lower boundary as depicted in FIG. 5 by line 510 is a piecewise linear function connecting the points in Table 4b of FIG. 4B.

In some embodiments, the method may include providing a partially wet composition in a mold while vibrating the mold, the partially wet composition, or both. The method may include transferring the partially wet composition to the mold while vibrating the mold, the partially wet composition, or both. The method may include compressing the partially wet composition in the mold while vibrating the mold, the partially wet composition, or both.

In some embodiments, making the building form may include vibration with a log-amplitude and frequency between a first boundary and a second boundary. In some embodiments, the first and the second boundaries may be described as piecewise linear functions connecting the points. In some embodiments, the first boundary may include a log-amplitude of about 200 mm/s at 0 Hz frequency, about 200 mm/s at 20 Hz frequency, about 200 mm/s at 30 Hz frequency, about 25 mm/s at 150 Hz frequency, about 2.0 mm/s at 350 Hz frequency, and about 1.0 mm/s at 600 Hz frequency. The second boundary may include a log-amplitude of about 0.1 mm/s at 0 Hz frequency, about 0.1 mm/s at 20 Hz frequency, about 5.0 mm/s at 50 Hz frequency, about 0.5 mm/s at 150 Hz frequency, about 0.1 mm/s at 400 Hz frequency, and about 0.1 mm/s at 600 Hz frequency.

In some embodiments, making the building form may include vibration with a log-amplitude and frequency from between about 200 mm/s to about 0.1 mm/s at 0 Hz frequency. Making the building form may include vibration with a log-amplitude from between about 200 mm/s to about 0.1 mm/s at 20 Hz frequency. Making the building form may include vibration with a log-amplitude from between about 200.0 mm/s at 30 Hz frequency to about 5.0 mm/s at 50 Hz frequency. Making the building form may include vibration with a log-amplitude from between about 25 mm/s to about 0.5 mm/s at 150 Hz frequency. Making the building form may include vibration with a log-amplitude from between about 2.0 mm/s at 350 Hz frequency to about 0.1 mm/s at 400 Hz frequency. Making the building form may include vibration with a log-amplitude from between about 1.0 mm/s to about 0.1 mm/s at 600 Hz frequency.

After releasing the molded first portion of the partially wet composition, the building form may be removed from the system on a production pallet and subsequently stored in a curing room. The molded building form may be cured for at least 48 hours or for at least 24 hours. In some embodiments, the cured building form may have a density of 21 to 24 lb/ft$^3$ (pcf). In some embodiments, the cured building form may have a density of 17 to 35 lb/ft$^3$. In some embodiments, the cured building form may have a 7-day compression strength of <40 psi. In some embodiments, the cured building form may have a 7-day compression strength of up to 60 psi or up to 100 psi.

In some embodiments, the system may mechanically transfer a second portion of the partially wet composition from the dispenser to the mold to form the second portion into the desired shape using the same mold instead of leaving the uncured building form in the mold for hours, days or even more to cure before removing the cured building form from the mold. Embodiments of the system described herein may only use a single mold or single set of molds (e.g., when more than one building form is manufactured at a time). As such a single mold or single set of molds may be used repeatedly by the system over a relatively short period of time to produce many building forms in a single day.

EXPERIMENTALS

I. Methods (for Collecting Vibrational Characteristics Expressed as Log-Amplitude Vs. Frequency):

Purpose:

The purpose of testing was to gather the range of vibration characteristics of the block machine mold.

Materials:

A velocimeter (Wilcoxon 783V) was attached using a magnetic base to the mold near a corner rib for maximum stiffness. The output of the velocimeter was routed to a National Instruments USB-9234 data acquisition D/A converter, then to Nelson Acoustics' Trident Multichannel Realtime Analyzer v6.11. The sensitivity of the transducer was checked via calibrator and found to be within 5% of its nominal value.

Methods:

Spectral data were determined by performing a narrowband analysis at 1 Hz resolution, with results in power spectral density using a Hanning window. Because the Hanning window spreads tonal energy in the frequency spectrum, we summed the energy in 5 adjacent lines centered on the first 8 drive harmonics, plus subharmonics ½, and in a few cases ⅓ and ⅔ as well. This process mathematically filters out incoherent vibrations at frequencies not associated with the drive. An 8×6 test matrix was agreed upon which included all combinations of: machine setting frequencies 30, 35, 40, 45, 50, 55 and 60 Hz and machine setting power levels 30, 40, 50, 60, 70, 80 percent. An extra element was added for the mold fill operation at machine settings of 38 Hz and 55 percent power. The compaction operation was described as a machine setting of 55 Hz and 70 percent power which is already part of the matrix.

Data:

Data was collected at each determined point and recorded into the Nelson Acoustics' Trident Multichannel Realtime Analyzer v6.11. Vibration signals were filtered in post-processing to highlight the relevant harmonics and subharmonics and suppress all other frequencies.

Results:

The results appear to be best expressed in "scatter plots" which relate vibration frequency to log-amplitude. It should be noted that a drive frequency of X Hz produces vibrations at X but also at nX where n refers to all positive integers. At high levels, fractional values of n (subharmonics) arise. The envelope of each overall signal was determined as a function of time: the time-weighted linear average velocity is reported. TABLE 4a in FIG. 4 depicts points along the upper bounds of the results in the scatter plots. TABLE 4b in FIG. 4 depicts points along the lower bounds of the results in the scatter plots. FIG. 5 depicts the upper and lower bounds as piecewise linear functions connecting the points depicted in TABLE 4a and TABLE 4b.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for preparing building forms including as least some cementitious materials, comprising:
   mixing cementitious material particles, closed cell foam particles, and water to form a partially wet composition; and
   making a substantially uncured building form wherein at least 50% of the volume of the building form comprises the closed cell foam particles by providing the partially wet composition in a mold while vibrating the mold, the partially wet composition, or both; and
   releasing the substantially uncured building form from the mold;
   wherein making the building form comprises vibration with a log-amplitude between a first boundary and a second boundary, wherein the first boundary comprises a first piecewise linear function defined by linear line segments extending between a first set of points comprising a log-amplitude of about 200 mm/s at 0 Hz frequency, about 200 mm/s at 20 Hz frequency, about 200 mm/s at 30 Hz frequency, about 25 mm/s at 150 Hz frequency, about 2.0 mm/s at 350 Hz frequency, and about 1.0 mm/s at 600 Hz frequency, and wherein the second boundary comprises a second piecewise linear function defined by linear line segments extending between a second set of points comprising a log-amplitude of about 0.1 mm/s at 0 Hz frequency, about 0.1 mm/s at 20 Hz frequency, about 5.0 mm/s at 50 Hz frequency, about 0.5 mm/s at 150 Hz frequency, about 0.1 mm/s at 400 Hz frequency, and about 0.1 mm/s at 600 Hz frequency.

2. The method of claim 1, further comprising coupling a velocimeter to the mold for measuring the vibration.

3. The method of claim 1, further comprising coupling a velocimeter to the mold for measuring the vibration, wherein the velocimeter is coupled at least adjacent a corner of the mold.

4. The method of claim 1, further comprising:
   coupling a velocimeter to the mold for measuring the vibration;
   performing a narrowband analysis; and
   mathematically filtering out incoherent vibrations.

5. The method of claim 1, wherein the building form comprises a reduced weight composite building form.

6. The method of claim 1, wherein the cementitious materials comprise cement and fly ash.

7. The method of claim 1, wherein the closed cell foam particles comprise polystyrene.

8. The method of claim 1, wherein the closed cell foam particles comprise expanded polystyrene.

9. The method of claim 1, further comprising mixing at least one additive with the water.

10. The method of claim 1, further comprising curing the building form, wherein the cured building form comprises a density of 17 to 35 lb/ft$^3$.

11. The method of claim 1, further comprising curing the building form, wherein the cured building form comprises a 7-day compression strength of up to 100 psi.

12. The method of claim 1, further comprising mixing at least one additive with the water, wherein at least one of the additives comprises plasticizers, super plasticizers, air entrainers, or viscosity modifiers.

13. The method of claim 1, wherein a ratio of the water to the cementitious material particles ranges from 0.20 to 0.40, 0.20 to 0.33, 0.23 to 0.28, or 0.24 to 0.26.

14. The method of claim 1, further comprising curing the building form, wherein the cured building form is structurally unsupportive without structurally supportive building materials positioned in one or more channels formed in the cured building form.

\* \* \* \* \*